May 12, 1959    H. VON KURNATOWSKI ET AL    2,886,687
ELECTRICALLY HEATED APPLIANCES AND METHOD OF THEIR MANUFACTURE
Filed Nov. 28, 1956

United States Patent Office 2,886,687
Patented May 12, 1959

2,886,687
ELECTRICALLY HEATED APPLIANCES AND METHOD OF THEIR MANUFACTURE

Hans von Kurnatowski, Traunreut, Rudolf Reitzenstein, Horpolding, Upper Bavaria, and Ludwig Schwank, Nurnberg, Germany, assignors to Siemens-Schuckertwerke Aktiengesellschaft, Berlin-Siemensstadt and Erlangen, Germany, a corporation of Germany Application November 28, 1956, Serial No. 624,883
Claims priority, application Germany October 27, 1956
24 Claims. (Cl. 219—37)

Our invention relates to electrically heated appliances, such as hot plates, which are equipped with a carrier body of ferrous material on which the insulated electric heating conductors are mounted between heat conducting ribs or fins or similar-type ferrous material. The heat radiating at all sides from the heating conductors is collected by the ribs and conducted to the heat transfer surface of the carrier body. The better the heat conductor ribs are joined with the carrier body, the better is the heat conductance and the shorter the heating-up period of the appliance.

There are several ways of joining the carrier body with the heat conducting ribs. It is known to make the carrier body and the ribs of cast iron so that they form a single piece of one and the same material. Such castings have relatively large wall thickness and correspondingly large weight, also a long heating-up period and large heat losses. For that reason, sheet steel of small wall thickness has been preferred as material for the carrier body and the heat conducting ribs. A heating appliance with such a sheet steel housing has lower weight, a shorter starting period and smaller heat losses than a corresponding cast iron design. For sheet-steel hot plates it has been proposed to insert the heat conducting ribs into grooves of the carrier body and to fasten the ribs in the grooves by upsetting of the ribs along their entire length or at individual points. Such manner of attachment requires complicated and expensive tools as well as much manufacturing time for machining the grooves into the sheet metal body and then inserting and upsetting the ribs. The ribs may also be secured in the grooves by heating and shrinking. It is further known to attach the ribs to the carrier body by welding methods, for instance, point- or seam-welding, or by hard soldering. The welding of thin-walled parts of steel involves the danger of burning and distorting the product. Besides, several types of steel, such as alloyed steels, are not suitable for welding because their texture and desired qualities are impaired by the welding heat. Therefore, thin parts of such steel are generally joined by soldering or brazing. Badly accessible junction points, too, are better made by brazing or hard-soldering than by welding. For such soldering, a metallic solder is used whose melting temperature is below the melting temperatures of the base materials to be joined. As a rule, the composition of the solder substances used for brazing and hard-soldering depart greatly from that of the base materials, this being always the case when ferrous materials are to be joined. Thus, the brazing or hard soldering of iron is effected either with pure copper or with alloys of copper with zinc, silver and nickel, the so-called "brazing alloys" (silver solders), and German-silver solders. At hard soldered junctions there often occurs a pronounced deterioration due to oxide formation which may cause cracking under changing temperature stresses. Junctions of ferrous materials made by brazing and hard soldering are not resistant to high temperatures as occurring in electric heating appliances of the above-mentioned type that require normal operation at incandescent temperatures for prolonged periods of time. The term "ferrous materials" as used herein is understood to cover all kinds of steel and iron, including cast iron.

Relating to hot plates and similar electrically heated appliances which comprise a carrier body and heat conducting ribs, both of ferrous material (base material), it is an object of our invention to improve such appliances by providing between the carrier body and the ribs a solder junction which is resistant to high temperatures and is readily applicable at relatively low manufacturing cost.

According to the invention the solder junctions of such appliances are formed of solder generally of the same type as the base materials, namely of iron, whose carbon content, however, differs from that of the base materials. That is, the carbon content is either considerably larger or smaller than that of the iron or steel of which the carrier body and the heat conducting ribs are made. By virtue of the fact that the solder and the base materials are similar in type, namely all of iron, but have respectively different carbon contents, the carbon is caused to migrate from areas of high concentration to areas of low concentration when, during the soldering operation, the junction is heated to a temperature of more than about 720° C. corresponding to the known lower limit of carbon diffusion in iron materials. Such carbon diffusion has the effect of enriching the carbon content of the carbon-poor material whereby the melting point of this material is reduced so that the formation of an alloy will take place between the base materials and the solder within a favorable temperature range, and a relatively wide intermediate alloyed layer is formed. A "favorable temperature range" is understood to relate to all temperatures at which the work pieces to be joined retain their original shape and resist deformation.

In the manufacture of a junction in accordance with the invention, two phenomena can be distinguished. First, a diffusion takes place in which a balancing of carbon-concentration differences between the solder and the work pieces takes place. The second phenomenon is the fusion soldering proper. It results in a characteristic intermediate, alloyed layer formed of the liquid solder and the melted surface layers of the base materials, comparable to the heat-affected zone occurring with gas-welding or electric welding when filler substances are added. The method to be used for the present invention is a combined welding and soldering operation which involves carbon diffusion and which may therefore be properly called "diffusion solder welding."

Electrically heated appliances with a carrier body and heat conducting ribs of similar ferrous materials, particularly steel, in which the body-rib junctions consist of diffusion solder joints according to the invention, combine best thermal qualities with long useful life because the high-temperature resistant junctions are durable and retain their strength even when the device is subjected to large alternating thermal stresses as they particularly occur with electrically heated appliances that are automatically regulated by temperature-responsive switches which repeatedly close and open the electric heating circuit so that the temperature varies continually between wide limits for obtaining a desired average heating temperature at the heating surface.

In heating appliances according to the invention, the carbon content of the ferrous solder, relating to the binary iron-carbon system, is preferably in the range from about 1% to about 4.5%. The silicon content of the solder is preferably adapted to the carbon content of the solder as is exemplified by the solder composition tabulated hereinafter. That is, it is preferable to keep the silicon content so small that it does not detrimentally affect any possible segregation of graphite. After solidification, the occurrence of free graphite on the solder should be avoided as much as possible because the oxidation of free carbon may cause hollow spaces which promote the occurrence of oxidation or flaking of the material. If the carbon content of the solder is relatively small, namely within the limits of about 0.5% to 1%, then the silicon content may range up to about 25%, the amount of silicon being limited, however, by any occurrence of excessive embrittlement. The main proportion of carbon in the solder, prior to performing the soldering operation, is preferably entirely or predominantly combined or dissolved, and the residual free carbon is preferably present as laminar or globular graphite in finest possible distribution.

Eminently suitable as a solder material for the purposes of the invention is white or mottled cast- or pig-iron of about 1% to about 4% carbon content. To produce capillaries, such as obtainable with silver solder, the solder is preferably provided with additive elements, such as manganese, phosphorus, silicon or different combinations of such elements. Such additive components of the mixture or alloy of the solder substance lower the viscosity or surface tension of the liquefied solder and reduce the temperature of the commencing solidification. In a solder of cast-iron character, the presence of phosphorus increases the stability of the pearlite. A large proportion of combined carbon is obtained with a low silicon content and a high phosphorus content. For improving the resistance to flaking or oxidation, the solder is preferably given an admixture or alloying addition of de-oxidizing elements, such as nickel, chromium or titanium, individually or in different combinations. When performing the soldering operation, the solder being used may either consist of a complete alloy or mixture of the desired composition, or the elements to be admixed must be supplied in fine-pulverulent form to the ferrous main substance of the solder prior to effecting the soldering proper.

For the purposes of the present invention, solders of the following approximate composition have been found to be particularly advantageous:

|  | Percent |
|---|---|
| Carbon | 0.5 to 4.5 |
| Silicon | 0.5 to 25 |
| Manganese | 0.2 to 0.6 |
| Phosphorus | 0.2 to 1.6 |

Rest iron.

If embrittlement of the soldered junction is not disturbing, the silicon content can be increased beyond the indicated range.

The invention will be more fully understood from the embodiment illustrated on the drawing and described in the following. On the drawing Fig. 1 is a top view of the carrier body of an electric hot plate joined with heat conducting ribs according to the invention;

Figure 1:
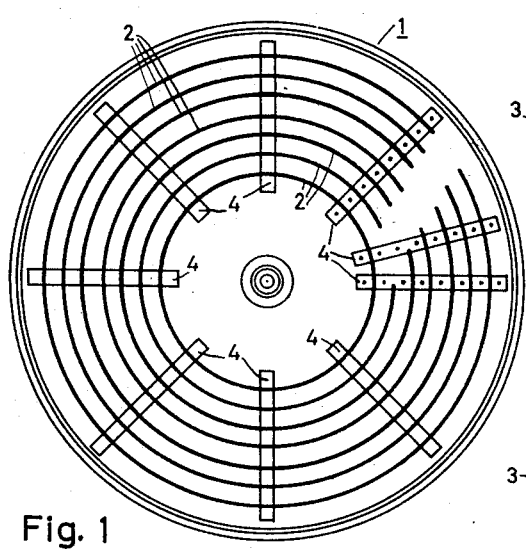
Figure 2:
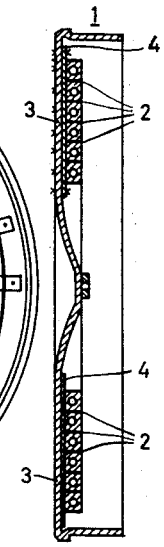
Fig. 2 is a vertical central cross section of the hot plate according to Fig. 1.

The illustrated electrically heated hot plate comprises a carrier body 1 (Figs. 1, 2) of sheet steel joined with several heat conducting ribs 2 also of sheet steel. The carrier body 1 has the shape of a cylindrical pan with an inwardly bulging bottom 3. The ribs 2 are ring-shaped and concentrically arranged. The insulated electric heating conductors 15 are inserted between the ribs.

Figure 3:
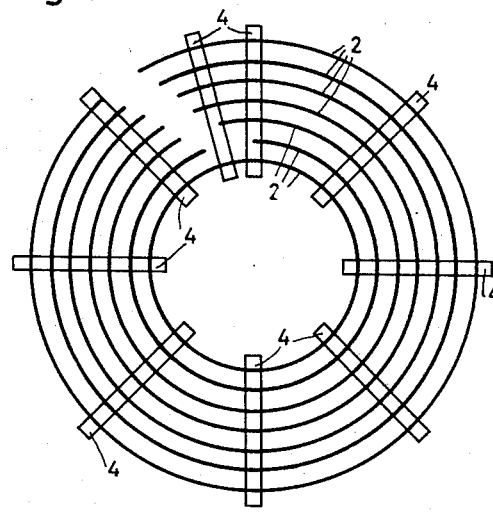
Fig. 3 is a top view and Fig. 4 a vertical central section of the heat conducting ribs joined together by bridge bars.
Figure 4:
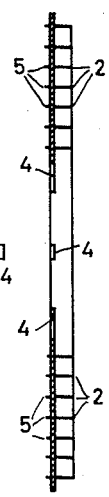
Figure 5:
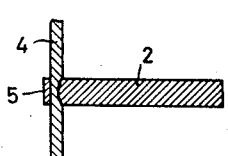
Fig. 5 shows, on a larger scale, one of the junctions between a heat conducting rib and a bridge bar.

When manufacturing the hot plate, the concentric ribs 2 are first joined by means of bridge bars 4 of sheet steel (Figs. 3, 4) to form a single insert assembly. The bridge bars 4 are preferably positioned between the carrier body 1 and the ribs 2 as shown. The ribs 2 stand on edge in vertical relation to the flat bridge bars 4. The ribs are attached by passing each bridge bar through a recess or opening of each rib 2, this opening being close to the bottom side 5 of the ribs (Fig. 5) so that the ribs can be placed directly onto the bottom 3 of the carrier body 1. Then the narrow side 5 of the ribs is either flush with the side of bridge bar 4 that faces the bottom 3, or the rib side 5 slightly protrudes from the bridge piece 4 as is shown in Fig. 5. The bridge bars 4 can be preliminarily attached to the ribs 2 by means of any known and suitable welding method. Preferably, the ribs 2, when in glowing and weldable condition, are pressed through or over the bridge bars 4. When thus assembled, the bridge bars secure the ribs 2 in proper relative position to each other. Thereafter the insert assembly of ribs 2 and bridge bars 4 (Figs. 3, 4) is inserted into the carrier body 1, and the bridge bars 4 are first attached to the bottom 3 in a merely temporary manner. This is done, for instance, by point welding. Care must be taken that the narrow sides 5 of the ribs 2 are now located directly upon the bottom 3 of the carrier body 1.

Figure 7:
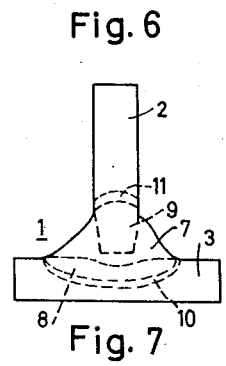

The high-temperature resistant junction between the ribs 2 and the bottom 3 of the carrier body 1, both made of sheet steel (base material) of the same or different respective compositions, is formed by a ferrous solder of a composition similar to that of the base materials but whose carbon content differs from that of the base materials, for instance by being considerably larger. As shown schematically in Fig. 7 the solder material of a completed joint penetrates into the junction place between the rib 2 and the bottom 3. The finished junction comprises a zone 7 formed of molten and re-solidified ferrous solder mixed with the ferrous base materials. The zones denoted by 8 and 9 exhibit pronounced carbonization, i.e. carbon enrichment due to diffusion of carbon into these zones from the carbon-rich, original solder material. The adjacent zones 10 and 11 of bottom 3 and rib 2, respectively, exhibit relatively weak carbon enrichment.

Figure 6:
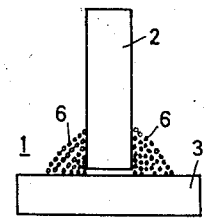
Figs. 6 and 7 show a junction between a heat conducting rib and the carrier body in intermediate and final stages, respectively, of the soldering operation.

For producing the solder joint just described, the solder material 6 is placed in pulverulent form upon the junction place of the work pieces, i.e. the bottom 3 and the rib 2, as shown in Fig. 6. Thereafter, the work pieces and the solder material, or rather the entire hot-plate assembly prepared for soldering, is heated to the hard-soldering temperature by means of any suitable heat source, for instance as generally known for hard soldering or brazing. When the temperature reaches approximately 900° C., the particles of the solder material do not yet sinter together. As such temperature, however, there commences an increase in carbonization of the base materials by diffusion of carbon from the solder 6 into the adjacent zones of bottom 3 and rib 2. The diffusion rate of the carbon is greatly dependent upon temperature. In order to obtain a concentrated enrichment in carbon of the base materials in the outermost marginal zones (8, 9 in Fig. 7), the heating of the parts to be soldered up to the soldering temperature must be as rapid as possible. Due to the concentrated carbon enrichment in the marginal zones of the base materials, the melting points of these carbon-enriched layers is reduced, and this promotes the fusing and melting together of these zones with the solder proper. This effect cannot be obtained, or occurs to a lesser extent, if the rate of heating is too slow. When the soldering is performed within a reducing protective gas atmosphere, such as hydrogen which causes formation of methane, then there is another reason for a short heating-up period of the solder. In such cases, a long heating period may cause the carbon of the atmosphere to react with the solder to such an extent that the solder becomes sufficiently enriched in carbon to increase the melting point of the solder. If carbon diffusion into deeper zones of the base materials is desired or if the carbon content of the solder is to be modified to a larger extent, then a longer glowing period, i.e. maintenance of the incandescent soldering temperature, is necessary. As the temperature increases during the soldering process, the solder particles commence to sinter. Now a fusion junction occurs between the already greatly carbon-enriched zones of the base materials and the adjacent solder particles. During the further increase in temperature, the solder becomes liquefied at the surface and the carbon enrichment in the base materials progresses into still deeper zones. When the solder is completely melted, it penetrates between the base materials and produces a good solder junction as described above with reference to Fig. 7. The melted and re-solidified solder, due to its adhesion properties, thus produces good corner or T joints as the case may be.

The rate of temperature increase and the flow of protective gas, if used, are thus set or controlled up to the melting of the solder so that the occurring carbon diffusion produces a sufficient carbon enrichment of the base materials, while the melting point of the solder is not increased excessively. During solidifying of the solder the rate of temperature decrease is preferably so kept or controlled that the continuing carbon diffusion results in further equalization of the carbon concentration in the materials that form the soldered joint. That is, the carbon diffusion continues after the soldering proper is completed, unless the cooling is too rapid.

Essential for satisfactory solder joints in electric high-temperature appliances according to the invention are clean, particularly oxide-free and metallically pure surfaces of the work pieces to be joined. Any existing oxide coatings must be removed. When producing a soldered junction according to the invention, conventional fluxing agents, such as borax or boric acid may be used. Similar results are obtained if the surface of the ferrous solder is covered with carbon powder or similar combustible substance or if the solder is mixed with such substances. Under the effect of the soldering heat, the carbon powder or similar covering or admixture will burn and produce a protective carbon-oxide gas atmosphere.

The use of fluxes is not necessary when the soldering is effected under a protective gas atmosphere. For this purpose an inert protective gas may be used, or a protective gas which has reducing properties in order to reduce any oxide skins that may be present on the work pieces to be soldered. Suitable as protective gas are oxygen-free, pure hydrogen or hydrogen-containing partial-combustion gas mixtures, such as cracking gas or city-gas mixtures, for instance. Starting substances for cheap protective gases are city gas, generator gas, propane and heavy hydrocarbons.

As mentioned, the method for producing a solder junction for the purposes of the invention can be performed with the aid of any suitable heat source known for conventional hard-soldering techniques. Preferably, however, the heating of the solder material and of the base materials is effected by electric high-frequency or medium-frequency induction heating. This affords limiting the soldering heat to the soldering localities proper and a completely clean manufacturing operation, as well as a saving in time and an improvement of the solder joints by virtue of the rapid temperature increase obtainable by induction heating.

Described in the following is a specific example of a junction-forming method with reference to compositions of material applicable for a hot plate as shown on the drawing.

Used for the carrier body 1 and the ribs 2 where sheet steels of the following composition:

| Steel for— | C, Percent | Si, Percent | Mn, Percent | P, Percent | S, Percent | Fe |
|---|---|---|---|---|---|---|
| carrier | 0.06 | 0.09 | 0.33 | 0.03 | 0.023 | rest. |
| ribs | 0.07 | 0.09 | 0.33 | 0.035 | 0.043 | Do. |

Used as solder material were the following equally well applicable compositions:

| Solder No. | C, percent | Si, percent | Mn, percent | P, percent | Fe |
|---|---|---|---|---|---|
| I | 3.23 | 0.5 | 0.2 | 0.90 | rest. |
| II | 3.52 | 1.87 | 0.26 | 0.025 | Do. |
| III | 0.9 | 15 | 0.3 | 0.2 | Do. |

The carrier plate and ribs, placed together and provided with powdered solder I, II or III in the manner described with reference to Fig. 6, were induction heated in a protective atmosphere from room temperature up to the melting point of the solder at about 1200° C., requiring a heating period of about 1 minute. At 1200° C. all crystals of the solder are liquified. After continued heating for about 0.5 minute up to the soldering temperature of about 1250° C., the solder became intimately fused and joined with the base materials.

This heating period may be followed immediately by cooling. Upon cessation of heat supply, a period of about 6 minutes is usually required for cooling the assembly down to a temperature of about 80° C. With a longer glowing period, i.e. retarded cooling for instance of 20 minutes, the zones (8, 9 in Fig. 7) of increased carbon enrichment become wider, but an increase in depth of these zones occurs only down to a temperature of about 720° C.

We claim:

1. An electrical heat appliance, comprising a carrier body and heat-conductance ribs, said body and ribs consisting of ferrous materials of the same type, and a heat-resistance junction intimately joining said ribs to said body and formed of ferrous solder substance similar in type to said material and containing carbon in an amount different from the carbon contents of said materials, said solder substance having a carbon content within the range of about 0.5 to about 4.5% relative to the binary system iron-carbon.

2. In an electric heat appliance according to claim 1, said ferrous substance of said junction containing an addition of viscosity reducing substance whereby the surface tension of the substance when liquid is reduced.

3. In an electric heat appliance according to claim 1, said ferrous substance of said junction containing an addition of viscosity reducing substance selected from the group consisting of manganese, phosphorous and silicon.

4. In an electric heat appliance according to claim 1, said ferrous substance of said junction containing an addition of oxidation-retarding substance.

5. In an electric heat appliance according to claim 1, said ferrous substance of said junction containing an addition substance selected from the group consisting of nickel, chromium and titanium.

6. An electrical heat appliance, comprising a carrier body and heat-conductance ribs, said body and ribs consisting of ferrous materials of the same type, and a heat-resistant junction intimately joining said ribs to said body and formed of ferrous solder substance similar in type to said material and containing carbon in an amount different from the carbon contents of said materials, said solder substance having a carbon content within the range of about 1% to about 4.5% relative to the binary system iron-carbon.

7. An electrical heat appliance, comprising a carrier body and heat-conductance ribs, said body and ribs consisting of ferrous materials of the same type, and a heat-resistant junction intimately joining said ribs to said body and formed of ferrous solder substance similar in type to said material and containing carbon in an amount different from the carbon contents of said materials, said solder substance having a carbon content, relative to the binary system iron-carbon, greater than about 0.5% but less than 1%, and said junction containing silicon in an amount below the embrittlement limit but not more than about 25%.

8. An electrical heat appliance, comprising a carrier body and heat-conductance ribs, said body and ribs consisting of ferrous materials of the same type, and a heat-resistant junction intimately joining said ribs to said body and formed of ferrous solder substance similar in type to said material and containing carbon in an amount different from the carbon contents of said materials, said solder substance having a carbon content within the range of about 0.5 to about 4.5% relative to the binary system iron-carbon, said carbon being substantially all in combined form and any free carbon being finely distributed graphite.

9. An electrical heat appliance, comprising a carrier body and heat-conductance ribs, said body and ribs consisting of ferrous materials of the same type, and a heat-resistant junction intimately joining said ribs to said body and formed of ferrous solder substance similar in type to said material and containing carbon in an amount different from the carbon contents of said materials, said solder substance having a carbon content within the range of about 0.5 to about 4.5% relative to the binary system iron-carbon, said junction consisting essentially of iron selected from the group consisting of white and mottled cast- and pig-iron.

10. Electrical heat appliance, comprising a generally pan-shaped carrier of ferrous material having an exterior heat-transfer surface and an interior bottom surface parallel to said heat transfer surface, a group of strip shaped and circular heat conductance ribs of ferrous material, each rib being disposed on edge adjacent said bottom surface in concentric relation to said other ribs, and a heat-resistant solder junction intimately joining each rib with said carrier and comprising a sintered body of ferrous substance extending between said bottom surface and said rib, and said junction having adjacent to said body two carbon-diffusion zones within said carrier and said rib respectively.

11. Electrical heat appliance, comprising a generally pan-shaped carrier of sheet steel having an interior bottom surface, a group of strip shaped and circular heat conductance ribs of sheet steel, each rib being disposed on edge adjacent said bottom surface in concentric relation to said other ribs, and a heat-resistant solder junction intimately joining each rib with said carrier and comprising a sintered body of cast iron which contains more carbon than said sheet steel of said carrier and said ribs, said body extending between said bottom surface and said rib, and said junction having adjacent to said body two carbon-diffusion zones within said carrier and said rib respectively, said junction having not more than about 4.5% carbon based upon total content of iron and carbon thereof.

12. The method of producing a junction between a ferrous carrier and ferrous heat conductance ribs of an electric heat appliance, which comprises placing the ribs adjacent the carrier, placing into the resulting corners a quantity of pulverulent ferrous solder substance having a carbon content differing from those of the carrier and ribs, and then heating the assembly to soldering temperature above 900° C. until the solder substance is sintered and the adjacent zones of carrier and ribs are fused together with said substance, neither the carrier nor the ribs having at the junction a carbon content more than about 4.5% based upon total content of carbon and iron.

13. The method of producing a hard-soldered junction between a ferrous carrier and ferrous heat conductance ribs of an electric heat appliance, which comprises placing the ribs adjacent the carrier, placing into the resulting corners a pulverulent ferrous solder substance having a carbon content differing from those of the carrier and ribs and not more than about 4.5% based upon the total content of iron and carbon in the solder, and then heating the assembly to soldering temperature within a protective non-oxidizing atmosphere until the solder substance is sintered and the adjacent zones of carrier and ribs are fused together with said substance.

14. The method of producing a hard-soldered junction between a ferrous carrier and ferrous heat conductance ribs of an electric heat appliance, which comprises placing the ribs adjacent the carrier, placing into the resulting corners a quantity of pulverulent ferrous solder substance and a fluxing agent, said solder substance having a carbon content other than said carrier and ribs and being in the range of 0.5% to 4.5% relative to the binary system iron-carbon, and then heating the assembly to soldering temperature until the solder substance is sintered and the adjacent zones of carrier and ribs are fused together with said substance.

15. In the method according to claim 12, the step of adding to the ferrous solder substance, prior to heating, a quantity of combustible powder.

16. The method of producing a hard-soldered junction between a ferrous carrier and ferrous heat conductance ribs of an electric heat appliance, which comprises placing the ribs adjacent the carrier, placing into the resulting corners a quantity of pulverulent ferrous solder substance having a higher carbon content than the carrier and the ribs, then heating the assembly to a temperature above 900° C. whereby, during the heating-up period and while the solder substance is still solid, the adjacent zones of carrier and ribs become enriched in carbon so that their melting point is reduced, and terminating the heating when the solder substance is sintered and the adjacent zones of carrier and ribs are fused together with said substance.

17. A method of assembly of the iron parts of an electrical heating appliance in the normal operation of which said parts are at incandescent temperatures for prolonged periods, said iron parts comprising a carrier body and means soldered thereto providing heat-conducting structure, said structure serving to provide channels in which electrically insulated electric heating means is positioned in the completed appliance, comprising soldering the body and the structure together by placing at the junction or junctions thereof a solder comprising iron, the iron of said parts and the iron of said solder having a content of carbon in at least one thereof, the carbon content of one being different from the other and being in the range of about 0.5 to 4.5% relative to the binary system iron-carbon, heating the junction at a temperature sufficient to cause diffusion of the carbon to enrich the carbon-poorer material to reduce the melting point of the latter material, alloy formation between the iron parts and the solder taking place.

18. A method of assembly of the steel parts of an electrical heating appliance in the normal operation of which said parts are at incandescent temperatures for prolonged periods, said steel parts comprising a carrier body and means soldered thereto providing heat-conducting structure, said structure serving to provide channels in which electrically insulated electric heating means is positioned in the completed appliance, comprising soldering the body and the structure together by placing at the junction or junctions thereof a solder comprising powdered iron, the steel of said parts and the iron of said solder each having a content of carbon, the carbon content of the solder being higher than that of the steel, heating the junction at a temperature sufficient to cause diffusion of the carbon to enrich the carbon-poorer steel to reduce the melting point of the steel, alloy formation between the steel parts and the solder taking place.

19. In the method according to claim 18, the step of covering the solder substance with carbon powder prior to heating.

20. The method according to claim 18, comprising the further step of cooling the junction from the soldering temperature at a rate sufficiently slow to permit continued carbon diffusion for equalization of the carbon concentration in the materials forming the junction.

21. A method of assembly of the steel parts of an electrical heating appliance in the normal operation of which said parts are at incandescent temperatures for prolonged periods, said steel parts comprising a carrier body and means soldered thereto providing heat-conducting structure, said structure serving to provide channels in which electrically insulated electric heating means is positioned in the completed appliance, comprising soldering the body and the structure together by placing at the junction or junctions thereof a solder comprising powdered iron, the steel of said parts and the iron of said solder each having a content of carbon, the carbon content of the solder being higher than that of the steel, heating the junction at a temperature sufficient to cause diffusion of the carbon to enrich the carbon-poorer steel to reduce the melting point of the steel, alloy formation between the steel parts and the solder taking place, the solder having a carbon content of not more than about 4.5% relative to the binary system iron-carbon.

22. A method of assembly of the steel parts of an electrical heating appliance in the normal operation of which said parts are at incandescent temperatures for prolonged periods, said steel parts comprising a carrier body and means soldered thereto providing heat-conducting structure, said structure serving to provide channels in which electrically insulated electric heating means is positioned in the completed appliance, comprising soldering the body and the structure together by placing at the junction or junctions thereof a solder comprising powdered iron, the steel of said parts and the iron of said solder each having a content of carbon, the carbon content of the solder being higher than that of the steel, heating the junction at a temperature sufficient to cause diffusion of the carbon to enrich the carbon-poorer steel to reduce the melting point of the steel, alloy formation between the steel parts and the solder taking place, the solder having a carbon content of about 0.5 to 4.5%, relative to the binary system iron-carbon.

23. A method of assembly of the sheet steel parts of an electrical heating appliance in the normal operation of which said parts are at incandescent temperatures for prolonged periods, said sheet steel parts comprising a carrier body and means soldered thereto providing heat-conducting structure, said structure serving to provide channels in which electrically insulated electric heating means is positioned in the completed appliance, comprising holding the channel-forming structure together by inserting bridging sheet steel members substantially radially through the structure closely adjacent a side edge surface of the structure, placing the so inserted bridging members adjacent the surface of the carrier body and soldering the carrier body, the bridging sheet steel members and the said sheet steel structure together by placing at the junction or junctions thereof a solder comprising iron, the steel of said parts and the iron of said solder each having a content of carbon, the carbon content of the solder being higher than that of the steel of the carrier body and of the said structure and being not more than about 4.5%, relative to the binary system iron-carbon, heating the junction or junctions at a temperature above about 720° C. and sufficient to cause diffusion of the carbon to enrich the carbon-poorer material of the carrier body and said structure, whereby the melting point of the latter material is reduced and alloy formation between the sheet steel parts and the solder takes place.

24. In an apparatus in the operation of which ferrous parts are subjected to incandescent temperatures, the improvement comprising a soldered junction for said parts, the junction comprising iron and carbon, there being a carbon content gradient between the junction and said parts, the carbon content of the junction being between about 0.5% to 4.5% based upon total content, in said junction, of iron and carbon.

References Cited in the file of this patent

UNITED STATES PATENTS

| 2,114,888 | Nawo | Apr. 19, 1938 |
| 2,164,650 | Goldthwaite | July 4, 1939 |
| 2,652,621 | Nelson | Sept. 22, 1953 |

FOREIGN PATENTS

| 487,263 | Great Britain | June 17, 1938 |

UNITED STATES PATENT OFFICE

CERTIFICATE OF CORRECTION

Patent No. 2,886,687                 May 12, 1959

Hans von Kurnatowski et al.

It is hereby certified that error appears in the above numbered patent requiring correction and that the said Letters Patent should read as corrected below.

In the heading to the printed specification, line 10, foreign filing date, for "October 27, 1956" read -- December 2, 1955 --.

Signed and sealed this 22nd day of September 1959.

(SEAL)
Attest:

KARL H. AXLINE
Attesting Officer

ROBERT C. WATSON
Commissioner of Patents